March 21, 1933.  J. G. VINCENT  1,902,050
LUBRICATING MEANS FOR AUTOMATIC TRANSMISSION MECHANISM
Original Filed Sept. 6, 1924
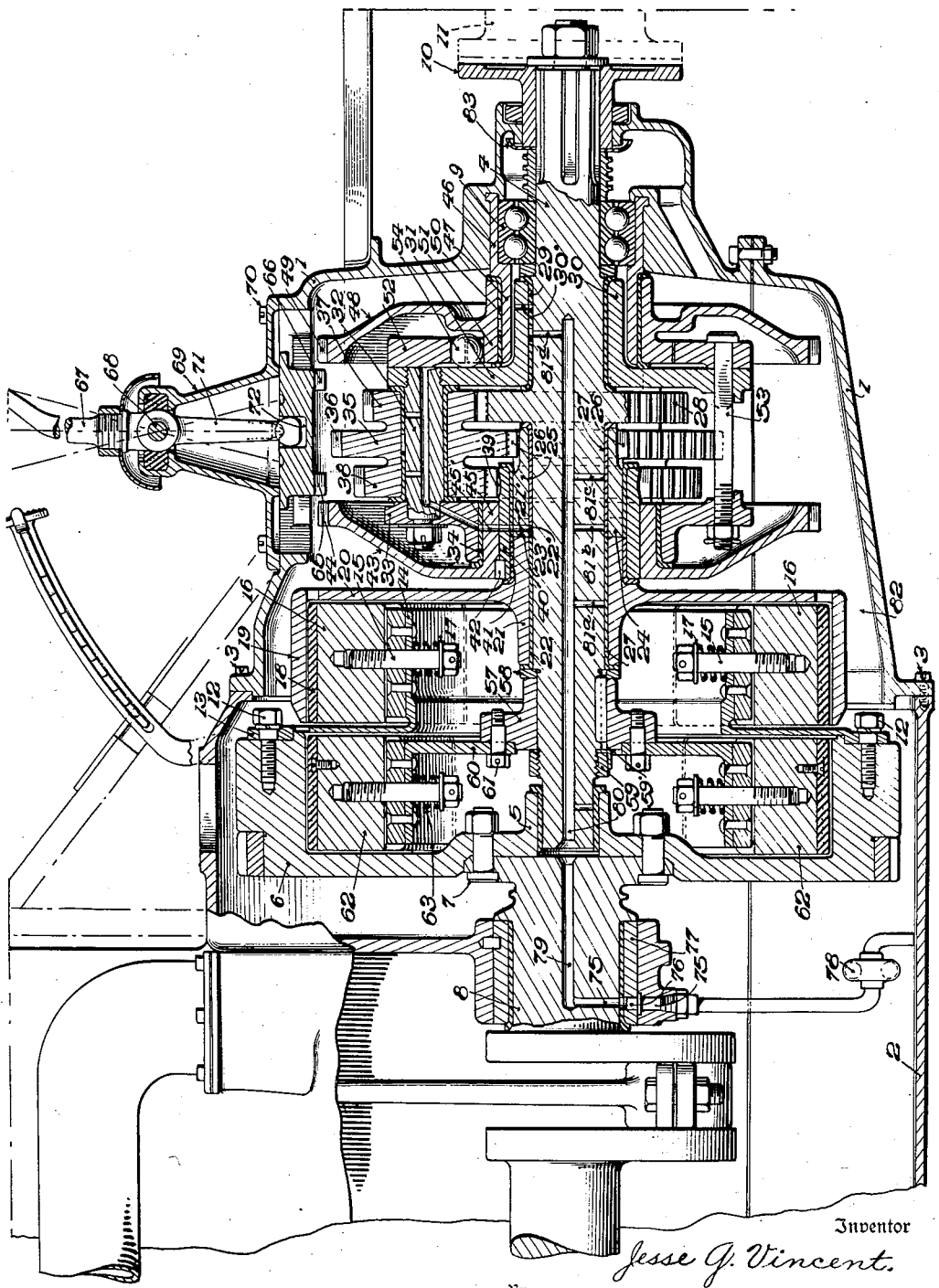
Inventor
Jesse G. Vincent.
By Cameron, Kerkam & Sutton,
Attorneys.

Patented Mar. 21, 1933

1,902,050

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

LUBRICATING MEANS FOR AUTOMATIC TRANSMISSION MECHANISM

Original application filed September 6, 1924, Serial No. 736,329, now Patent No. 1,744,182, dated January 21, 1930. Divided and this application filed December 11, 1929. Serial No. 413,374.

This application is a division of my application Serial No. 736,329, filed September 6, 1924, resulting in Patent No. 1,744,182, granted January 21, 1930.

This invention relates to lubricating means for power transmitting mechanism. In such mechanism no efficient means have heretofore been available for lubricating the parts and the present invention has for its object to provide a suitable oiling system that shall insure proper lubrication of all moving parts in a mechanism of this character. The inventive idea is capable of receiving a variety of mechanical embodiments, and is also capable of use in connection with power transmitting mechanisms differing in specific construction. One application of the invention is illustrated in the accompanying drawing but it is to be expressly understood that such drawing is for the purpose of illustration only and is not intended to define the limits of the invention, reference being had to the appended claims for this purpose.

The accompanying drawing is a sectional side elevation of an automatic transmission mechanism having my lubricating system applied thereto.

In order to enable my lubricating system to be clearly understood, I will first describe in detail the automatic transmission mechanism shown in the drawing, after which I will describe my lubricating system applied thereto.

Referring to the drawing, 1 is the housing of an automatic transmission mechanism which is secured at its forward end to the fly wheel housing 2 by means of bolts 3. Rotatably supported in housing 1 is a transmission shaft 4 having its forward end journaled in a spigot bearing 5 formed in the hub of a flywheel 6 that is secured by bolts 7 to the after flanged end of the engine crank shaft 8. The projecting rear end of shaft 4, which is supported by a bearing 9, is grooved to receive a splined, universal-joint member 10, whereby shaft 4 may be connected to the usual drive shaft 11.

Secured to the rear face of flywheel 6 by bolts 12 is a low speed clutch spider 13 having a rearwardly extending hub portion 14 to which are attached, by means of pins 15, a plurality of low speed clutch sectors or shoes 16. Springs 17, which surround pins 15 between the heads of the latter and the inner periphery of hub 14, oppose radial movement of shoes 16, but at a predetermined speed of flywheel 6, said shoes, which are provided on their outer peripheries with suitable friction material or lining 18, move radially into engagement with the inner surface of the flange 19 of a clutch drum 20 provided with a hub 21 that is journaled on a bearing 22 on shaft 4.

The clutch hub 21 is provided at its rear end with clutch jaws 23 that engage similar jaws 24 formed in the hub 25 of a gear 26 that is journaled on a bearing 27 on shaft 4. The rear end of bearing 27 is axially positioned by engagement with the forward face of a gear 28 that is preferably formed integral with shaft 4. Clutch jaws 23 and 24 are in engagement at all times in order that clutch drum 20 and gear 26 will always rotate in unison. If the clutch jaws were omitted and hubs 21 and 25 were formed integrally it would be impossible to assemble the parts.

Mounted on shaft 4, immediately rearward of gear 28, is a bearing 29 on which is rotatably mounted the rearwardly extending hub 30 of a planet gear spider 31. Into the latter are threaded, or otherwise suitably secured, a plurality of journal pins 32 which are secured at their forward ends in a companion spider 33 that is rotatably mounted on a bearing 34. A cluster of three integrally formed planet gears 35 is rotatably mounted on each of the pins 32, and the center gear 36 of said cluster is in constant engagement with gear 26. The after gear 37 of each cluster is in continuous engagement with gear 28, formed on shaft 4, while the third and forward gear 38 is at all times in mesh with a gear 39 formed integral with a forwardly extending sleeve 40 that is rotatively mounted on a bearing 41 positioned on hubs 21 and 25. Rigidly secured to sleeve 40, as by means of a key 42, is a disk gear 43, provided with peripheral teeth 44, and having a rearwardly extending hub 45 on which is mounted the bearing 34. Sleeve 40 and hub 45 are separately formed and keyed together to permit of assembly.

Interposed between bearing 9 and housing 1 is a bearing retainer 46 provided with a forward extension 47 on which is rotatably mounted a second disk gear 48 provided on its periphery with radial teeth 49. Any suitable type of bearing 50 is interposed between retainer extension 47 and the hub 51 of gear 48. The forward portion of hub 51 forms the inner element of an overrunning ball clutch the outer element being constituted by a ring 52 secured to the rear face of planet spider 31 by bolts 53 which preferably extend through both of the planet spiders 31 and 33. Between the clutch elements 51 and 52 are a plurality of clutch balls 54 which seat, in one direction of rotation, but which drop into recesses or pockets in the opposite direction of rotation.

Rigidly attached in any suitable manner to the forward portion of transmission shaft 4 and intermediate spigot bearing 5 and clutch drum hub 21, is a flanged hub member 57 which is axially positioned by means of a spacer 58 that has its rear face in engagement with the forward flanged end of bearing 22. Forward axial movement of hub 57 is prevented by means of a nut 59 threaded onto shaft 4 and a suitable lock washer 59'. A high speed clutch drum 60 is attached by means of bolts 61 to the flange of hub 57. Resiliently and movably mounted on the rim of drum 60, in a manner similar to that described in connection with the low speed clutch spider 13, are a plurality of centrifugally actuated clutch shoes or sectors 62 of any suitable type. The springs 63, that are employed for controlling the radial movement of shoes 62, are adapted to yield to centrifugal force when transmission shaft 4 rotates at a predetermined speed.

Slidably mounted on suitable shoulders formed in the top of transmission housing 1 is a locking member or block 64 that is provided on its lower surface with a forward set of teeth 65, which are adapted to engage the teeth 44 of disk gear 43, and a rear set of teeth 66 that are adapted to be moved into mesh with the teeth 49 of disk gear 48. The sets of teeth 65 and 66 are so spaced that it is impossible for both sets to be simultaneously in engagement with the teeth of the respective disk gears.

In order that block 64 may be longitudinally moved to lock either gear 43 or gear 48 against rotation, there is provided a control lever 67 that is pivoted as at 68 to a cover plate 69 of any suitable form, the latter being secured by bolts 70 to the upper surface of transmission housing 1. The lower end 71 of lever 67 extends into a pocket 72 formed in the upper surface of block 64.

The bearings of the transmission mechanism are adapted to be lubricated by oil under pressure, the oil being taken from the pressure oiling system of the engine. To this end a radial duct 75 is provided in the rear main journal of shaft 8, which duct is in communication, in the usual or any suitable manner, through a passage 76 in the bearing 77, with the pressure side of a lubricating force feed pump 78. While the latter is illustrated as being of the gear type and located directly below the rear main bearing 77, it will be understood that this is a diagrammatic showing only, and that pump 78 may be of any suitable type and may be mounted in any desired position. Duct 75 communicates with a rearwardly extending axial duct 79, formed in shaft 8, which registers with a similar passage 80 formed in transmission shaft 4. The connection between ducts 79 and 80 is formed by the spigot bearing 5 in the plane of flywheel 6. Extending radially from passage 80 are a plurality of ducts $81a$, $81b$, $81c$, $81d$, for conducting the oil to the various concentric bearings. One manner in which these radial ducts may be formed is illustrated. As shown, oil forced to bearing 22 passes through a radial passage 22' therein, a radial passage 21' in hub 21, a passage 45' in hubs 40 and 45, bearing 34, and spider 33 to journal pins 32. Passage 80 preferably terminates approximately in the plane of disc gear 48 and one of the radial passages, $81d$, adjacent the rear end supplies lubricant to bearing 29 for spider 31. Hub 30 of this spider is provided with a radial passage 30' in order that oil may be forced to the rear bearing 9 of shaft 4. Other radial oil passages are provided where necessary. Oil from the lubricated parts drains back to the engine crank case through a passage 82 adjacent the bottom of the transmission housing. The rear end of shaft 4 is preferably provided with an oil baffle 83 of any desired type to prevent leakage at this point.

While the automatic transmission mechanism and my lubricating system applied thereto have been described in considerable detail in order that the invention might be clearly understood, the invention is not limited to the specific transmission mechanism shown and described, nor to the specific details of the lubricating system as applied thereto, but that the inventive idea is susceptible to various mechanical expressions within the limits of the appended claims.

The automotive transmission herein described is not claimed per se herein, since the same forms the subject matter of my application, Serial No. 736,329, filed September 6, 1924, of which this application is a division.

What is claimed is:

1. A device of the class described comprising, in combination with an engine having a power shaft and a flywheel therefor, a driven shaft provided with an axial oil duct having radial branches, said duct being in communication with the pressure oil system of the engine in the plane of said flywheel, an oil baffle carried by the rear end of said driven shaft and means including centrifugally actuated clutch sectors for transferring power from said flywheel to said driven shaft, said branches leading to the bearings associated with said means.

2. A device of the class described comprising, in combination with an engine having a power shaft and a flywheel therefor, a driven shaft provided with an axial oil duct in communication with the pressure oiling system of the engine in the plane of said flywheel, and means including centrifugally actuated members for transmitting power from said flywheel to the driven shaft.

3. A device of the class described comprising, in combination with a power shaft having an axial oil passage therein and pressure means for forcing a lubricant through said passage, a flywheel secured to said shaft, a bearing on the flywheel, transmission mechanism including a driven shaft having an axial oil passage and having its forward end journalled in said bearing, said passages being connected by said bearing.

4. A device of the class described comprising, in combination with an engine having a pressure oiling system, a driven shaft, transmission gearing journalled on said shaft, speed responsive means controlling said gearing, means connecting the gearing and the speed responsive means with the pressure oiling system, and means returning the overflow of oil to said system.

5. A device of the class described comprising, in combination with an engine having a pressure oiling system, a driven shaft, bearings supporting the shaft at either end thereof, a driving member having an elongated hub journalled on the shaft, a planet spider surrounding the hub concentric thereto and having bearing pins, planet gear units journalled on said pins, and means including communicating ducts in the shaft and in the planet spider to conduct oil from the pressure system to the various bearings.

6. A device of the class described comprising, in combination with a power shaft having an axial oil passage therein and pressure means for forcing a lubricant through said passage, a flywheel secured to said shaft, a driven shaft having an axial oil passage in communication with said first named passage and having a plurality of radial ducts communicating with the axial passage, said driven shaft being operatively connected to said flywheel, and a plurality of transmission elements concentrically mounted on the driven shaft and provided with radial ducts to receive lubricant forced through the radial ducts in the driven shaft.

In testimony whereof I have signed this specification.

JESSE G. VINCENT.